United States Patent
Fleck et al.

(10) Patent No.: US 7,965,830 B2
(45) Date of Patent: Jun. 21, 2011

(54) NETWORK ELEMENT AND METHOD OF MAPPING ADDRESS INFORMATION

(75) Inventors: Andreas Fleck, Falkensee (DE); Jan Dehnel, Berlin (DE)

(73) Assignee: Alcatel-Lucent, Paris (FR)

(*) Notice: Subject to any disclaimer, the term of this patent is extended or adjusted under 35 U.S.C. 154(b) by 1808 days.

(21) Appl. No.: 11/110,706

(22) Filed: Apr. 21, 2005

(65) Prior Publication Data

US 2005/0254439 A1 Nov. 17, 2005

(30) Foreign Application Priority Data

May 11, 2004 (EP) ..................................... 04291206

(51) Int. Cl.
*H04M 7/00* (2006.01)
(52) U.S. Cl. .............................. 379/221.13; 379/221.09
(58) Field of Classification Search ............. 379/201.12, 379/207.02, 207.11, 207.14, 221.06, 221.14, 379/225, 230–234; 707/704.1
See application file for complete search history.

(56) References Cited

U.S. PATENT DOCUMENTS

| | | | | |
|---|---|---|---|---|
| 5,321,743 A * | 6/1994 | Bogart et al. | ............ | 379/221.14 |
| 5,404,395 A * | 4/1995 | Bogart et al. | ............ | 379/201.03 |
| 5,442,683 A * | 8/1995 | Hoogeveen | ................... | 455/403 |
| 5,533,148 A * | 7/1996 | Sayah et al. | ................... | 382/240 |
| 5,553,130 A | 9/1996 | Turner | | |
| 5,654,958 A * | 8/1997 | Natarajan | ..................... | 370/410 |
| 5,745,892 A * | 4/1998 | Miyata et al. | ................. | 707/102 |
| 6,069,945 A * | 5/2000 | Brown et al. | ............ | 379/220.01 |
| 6,097,801 A * | 8/2000 | Williams et al. | ......... | 379/221.13 |
| 6,115,716 A * | 9/2000 | Tikkanen et al. | ..................... | 1/1 |
| 6,122,258 A * | 9/2000 | Brown | ........................... | 370/256 |
| 6,522,632 B1 * | 2/2003 | Waters et al. | .................. | 370/254 |
| 6,625,273 B1 | 9/2003 | Ashdown et al. | | |
| 6,718,419 B1 * | 4/2004 | Delvaux | ........................ | 710/305 |
| 6,791,971 B1 * | 9/2004 | Osman et al. | ................. | 370/352 |
| 7,031,320 B2 * | 4/2006 | Choe | ........................ | 370/395.31 |
| 7,043,002 B2 * | 5/2006 | Delaney et al. | ............... | 379/229 |
| 7,277,385 B2 * | 10/2007 | Kinnunen | ..................... | 370/230 |
| 2002/0114440 A1 * | 8/2002 | Madour et al. | ................ | 379/219 |
| 2004/0254926 A1 * | 12/2004 | Balogh | ............................ | 707/4 |

* cited by examiner

*Primary Examiner* — Simon Sing
*Assistant Examiner* — Assad Mohammed
(74) *Attorney, Agent, or Firm* — Harness, Dickey & Pierce, P.L.C.

(57) ABSTRACT

The invention concerns a network element (4) for a telecommunication network (1) and a method of mapping address information according to a network numbering plan of the telecommunication network (1) to service access codes or network element addresses. The network element (4) receives address information according to the network numbering plan of the telecommunication network (1) and extracts a search key from the received address information. It provides a memory (42) with a data structure for representing, retrieving and modifying translation information mapping address information according to the network numbering plan to service access codes or network element addresses. The data structure has a tree structure with nodes and leaves operatively chained together wherein at least one of the nodes holds information nominating which part of the search key will be used to determine the branching of the respective node. The network element (4) applies the search key on the data structure of the memory by a key walk logic searching the key structure, the key walk logic extracts the part of the search key nominated by the respective node and determines the branching of the node by means of the extracted part of the search key.

10 Claims, 3 Drawing Sheets

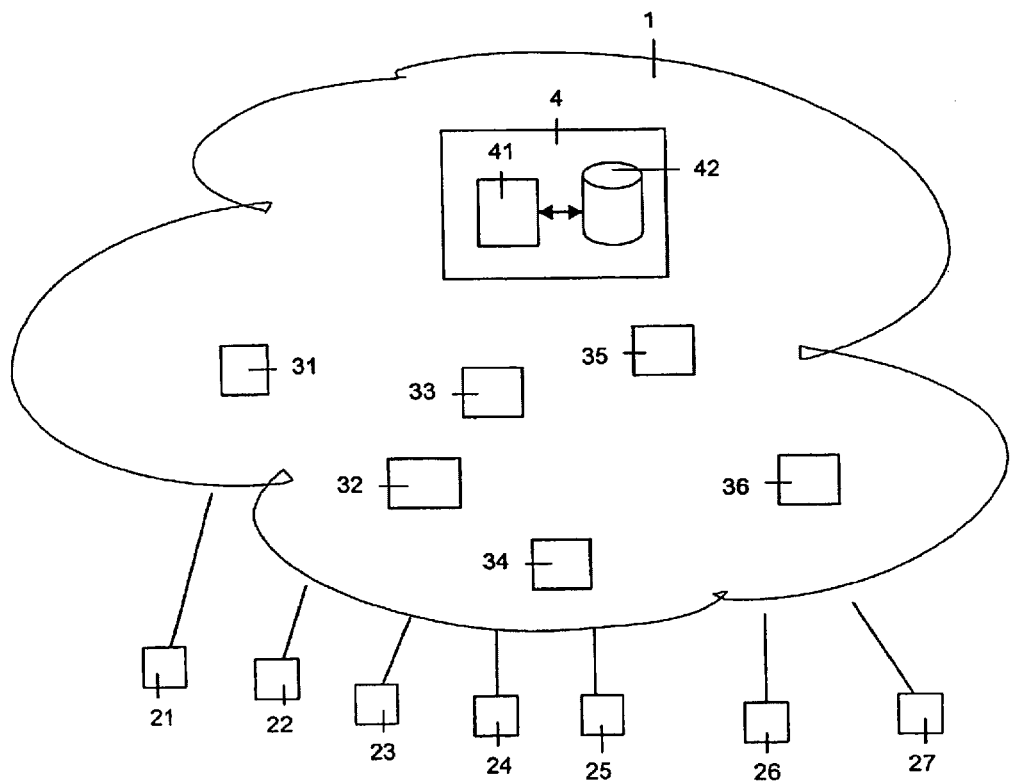
Fig. 1
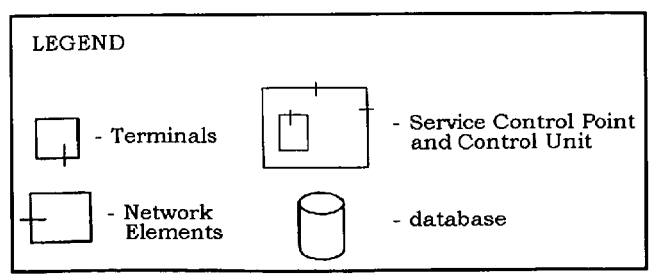

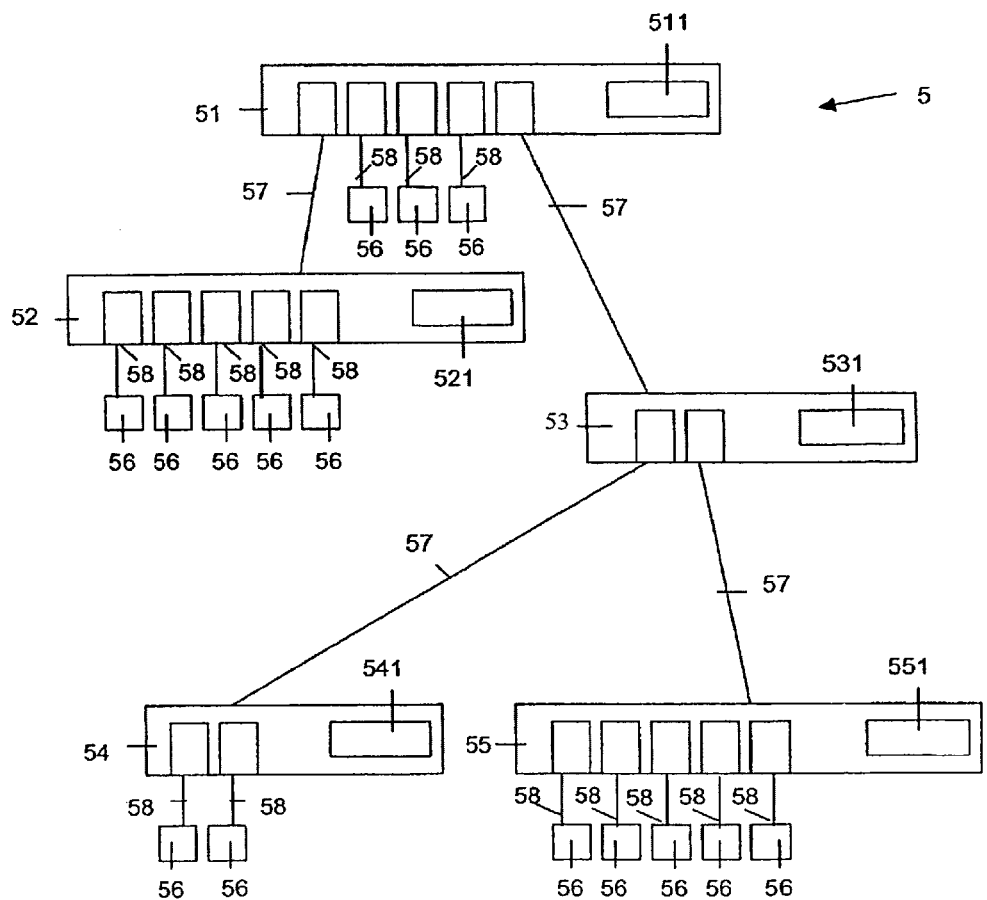
Fig. 2
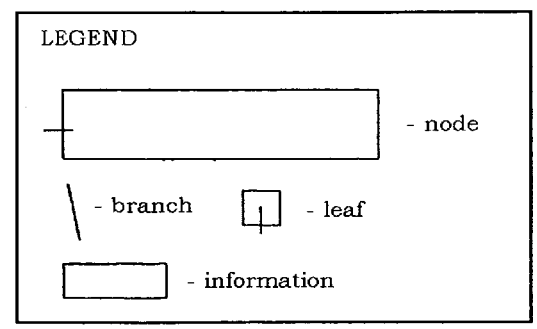

NETWORK ELEMENT AND METHOD OF MAPPING ADDRESS INFORMATION

TECHNICAL FIELD

The invention relates to a network element for a telecommunication network and a method of mapping address information according to a network numbering plan of a telecommunication network to service access codes or network element addresses.

The invention is based on a priority application, EP04291206.3, which is hereby incorporated by reference.

BACKGROUND OF THE INVENTION

Today's telecommunication networks have to provide enhanced switching and service provision functionalities requiring the mapping of address information according to the network numbering plan of the telecommunication network towards service access codes and/or network element addresses.

For example, number portability in a telecommunication network permits a user to retain their telephone number whenever the end-user changes from one telecommunication service provider domain to another telecommunication service provider domain.

The provisioning of a number of portability service for mobile subscribers is, for example, described in U.S. 2002/0114440 A1. The telecommunication network includes a set of service provider domains. Some of these domains are mobile telecommunication domains serving mobile stations. At least some of the areas served by these domains can be, and likely are, geographically coextensive. Further, some of the domains serve fixed stations. Fixed station domains include at least one local exchange that is connected with a plurality of fixed subscriber stations. Mobile telecommunication domains each have respective gateway nodes each of which take the form of gateway mobile switching center (GMSC). Further, mobile telecommunication domains each include respective data bases connected to and maintained by service management systems, respectively. These data bases are subscriber location servers including information which facilitates number portability for many types of subscribers in their respective domains, including mobile subscribers.

Typically, a hashing algorithm is used to search number portability data bases as it is normally used in commercially available data bases.

Further, U.S. Pat. No. 6,625,273 B1 describes the provisioning of a local number portability service within a public switched telecommunication network based on the SS7 protocol.

In case of local number portability, standard calls like toll-free calls, calling-cut-calls and other such calls require additional data in order to be routed by the signaling transfer points (STPs). The transaction capabilities application part (TCAP) functionality defined in the SS7 protocol is used to obtain the additional routing information required to complete these calls. TCAP messages are exchanged between SSPs and SCPs (=Service Control Point) for a variety of queries. For such call, the SCPs are responsible for call routing data. To improve this system, an additional system is installed between the service providers SSP and the network that acts as local cache storing the results of SCP queries. When subsequent requests for the same lookup are received, the query is intercepted, a lookup is performed and the locally stored number is sent back to the SSP. Then the SSP has the information necessary to complete the call. The query results are stored in the local cache with a defined expiration time. After the result expires from the cache, the subsequent request for the lookup will be executed in the standard fashion, that means retrieving the information from the SCP and repopulating the local cache.

According to this concept, a cache memory having a list of translation information is searched to provide number portability.

SUMMARY OF THE INVENTION

It is the object of the present invention to improve the efficiency of network elements of a telecommunication network mapping address information according to a network numbering plan of a telecommunication network to service access codes or network element addresses.

The object of the present invention is achieved by a method of mapping address information according to a network numbering plan of a telecommunication network to service access codes or network element addresses, the method comprising the steps of: receiving address information according to a network numbering plan of the telecommunication network; extracting a search key from the received address information; providing a memory with a data structure for representing, retrieving and modifying translation information that maps address information according to the network numbering plan to service access codes or network element addresses, the data structure having a tree structure with nodes and leaves operatively chained together wherein at least one of the nodes holds information nominating which part of the search key will be used to determine the branching of the respective node; applying a search key on the data structure of the memory by a key walk logic searching the tree structure, the key walk logic extracts the part of search key nominated by the respective node and determines the branching of the node by means of the extracted part of the search key. The object of the present invention is further achieved by a network element for a telecommunication network, the network element comprising: means for receiving address information according to a network numbering plan of the telecommunication network; means for extracting a search key from the received address information; a memory with a data structure for representing, retrieving and modifying translation information that maps address information according to a network numbering plan to service access codes or network element addresses, the data structure having a tree structure with nodes and leaves operatively chained together, wherein at least one of the nodes holds information nominating which part of the search key will be used to determine the branching of the respective node; and means for applying the search key on the data structure of the memory by a key walk logic searching the tree structure, the key walk logic extracts the part of the search key nominated by the respective node and determines the branching of the node by means of the extracted part of the search key.

In contrast to known tree structures, for example binary trees, which use every part (bit, character . . . ) of a search key to determine which subtree to select, the specific tree structures used for the invention nominate, for example by storing its position in the node, which element of the key will next be used to determine the branching. This removes the need for any node with just one descendent. In contrast to binary tree structures, the index records only true i.e. genuine, branches. Phrases with only one proper right extension are not recorded in the index. This fact reduces the number of index rows to only twice a number of starts, and makes it independent of the lengths of the stored phrases. According to the invention, the specific tree structure is applied for fast storage and retrieval of numbers, e.g. telephonic numbers and mobile identities, in data bases of telecommunication systems in the context of numbers (alpha numeric) based service deployment like number portability. Due to the specifics of the network numbering plans of telecommunication systems the invention achieves a very compact and modular structure of the translation information which results in reduced memory and computation power consumption. Further, the modification and complexity is optimized to the specifics of mapping address information according to a network numbering plan to service access codes or network element addresses. The synchronization between service nodes for prefixed dependent processing is improved due to the modularity of the structure with respect to prefixed modularization. The efficiency compared with binary trees and hashed table is substantially increased with the growing of the number of entries. As a network node has to deal with up to 100 million entries, substantial advantages with respect to memory size and computation time are achieved. Further, open numbering becomes possible. Further, the invention reduces the complexity of search algorithm for closed numbering with ambitious numbering plans (for example entry for 1234 as well as for 123456).

Further advantages are achieved by the embodiments indicated by the dependent claims.

According to a preferred embodiment of the invention, nodes of the data structures are labeled with additional information, for example information about number ranges of the network numbering plan, NDCs (NDC= . . . ), area codes or the minimum or maximum number of digits within a specific numbering range. This additional information is stored by the key walk logic when walking a subtree of the respective labeled node. The stored information may be later on used by the key walk logic as default information for mapping and branching functionalities. This concept opens the possibility to shape the data structure to the specifics of the respective network numbering plan. This guarantees high performance with existing infrastructure and reuse of multiple networking applications.

Preferably, at least one node is labeled with additional number range information mapping at least one number range of the network numbering plan to a service access code or network element address, wherein the labeled number range is covered by the part of these search keys nominated by the node. Leaves of a subtree of the label node concerns exception numbers. The key walk logic stores labeled number range information of a parent node when walking its subtree and applies the stored number range information, if no leaf or node is signed to the selected branch.

This concept overcomes performance bottlenecks of existing tree structures:

Per service control type one set of non-overlapping default ranges can be set up. These sets are independent from each other. Therefore it is possible to have overlapping default ranges for different service control types.

A storage of the default ranges of all service control types in one traditional tree, for example a Binary Tree, B-Tree or Trie is not possible because the numbers would have to be used as key and this would not be unique. With traditional tree structures for each service control type one tree instance would have to be used and one additional tree instance for the exception number entries.

For creation of exception number entries all matching default ranges have to be retrieved to take over the set assignments for the service control types to the exception number entry. In case of traditional tree structures this would mean one tree search for each of the said trees would have to be performed.

In contrast to this, the tree structure of a network element according to this embodiment of the invention is extended with the ability to store number and number range information of multiple type. Thereby, the invention provides a high performance and efficient mapping of address information according to a network numbering plan to service access codes or network element addresses.

Preferably, the memory is a number portability data base and nodes nominate number prefixed ranges of the address information applied to the number portability data bases as nominated part of the search key. Thereby, number portability features are provided within telecommunication network in a fast and efficient way.

BRIEF DESCRIPTION OF THE DRAWINGS

These as well as other features and advantages of the invention will be better appreciated by reading the following detailed description of presently preferred exemplary embodiments taken in conjunction with accompanying drawings of which:

FIG. 1 shows a block diagram of a telecommunication system with a network element according to the invention;

FIG. 2 shows a functional view of a data structure used by the network element of FIG. 1.

DETAILED DESCRIPTION OF THE INVENTION

Figure 3:
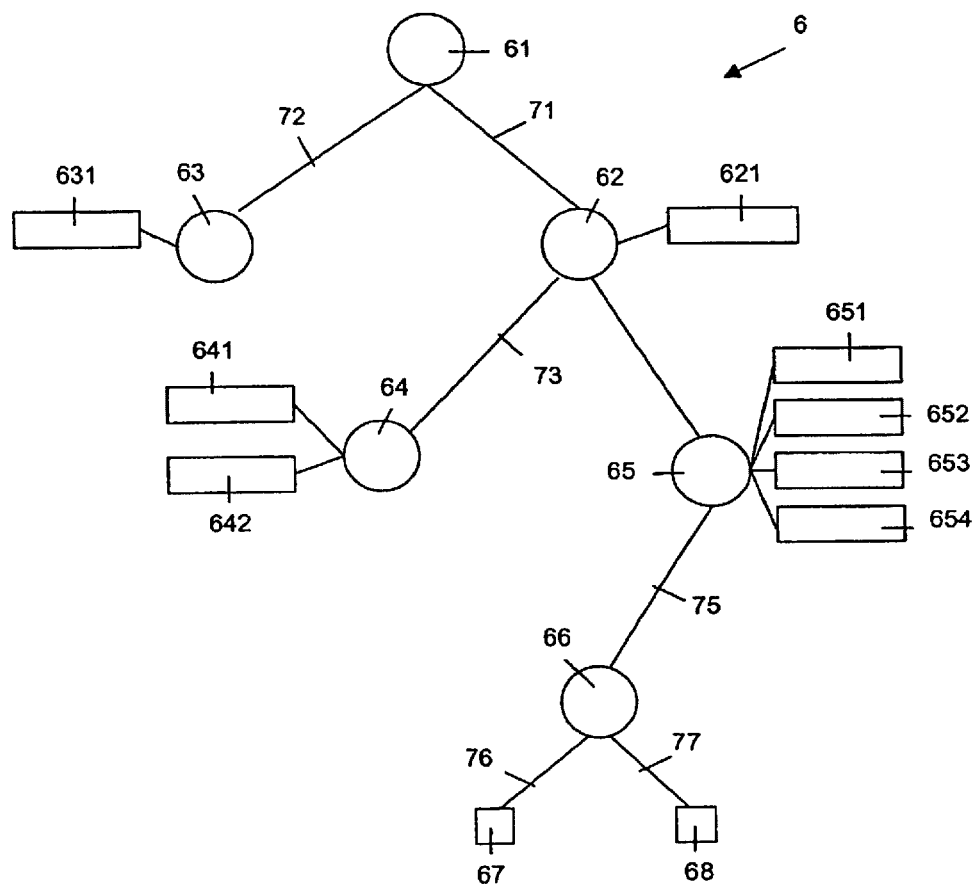
FIG. 3 shows a functional view of a data structure according to a further embodiment of the invention.
Figure 3:
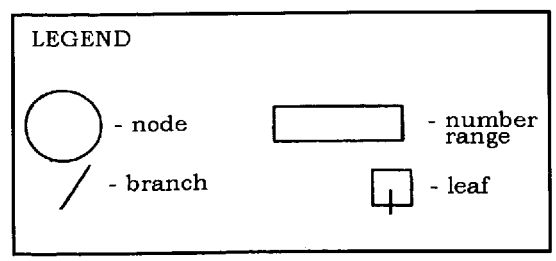

FIG. 1 shows a telecommunication network 1 and a plurality of terminals 21 to 27.

The telecommunication network 1 is a fixed telephone network, preferably a PSTN-network or ISDN-network (PSTN=Public Switched Telecommunication Network; ISDN=Integrated Services Digital Network). But, it is also possible that the telecommunication network 1 is a mobile telephone network, preferably according to the GSM or UMTS standard (GSM=Global System for Mobile Communication; UMTS=Universal Mobile Telecommunications System). Further, it is possible that the telecommunication network 1 provides both, fixed and mobile telecommunication services. According to a preferred embodiment of the invention, the telecommunication network provides, beside pure telephone services, enhanced services enabling the transmission of voice, data and video streams. In such case, the telecommunication network 1 comprises one or several data networks, for example IP-based networks (IP=Internet Protocol). According to a further possibility the telecommunication network 1 is a next generation network which provides stream like data transmission services based on packet technology.

According to a first embodiment of the invention, the invention is used to provide a number portability service within the telecommunication network 1. In such case, two or more competitive network operators share the network numbering plan of the telecommunication network 1. The telecommunication network 1 is formed by a plurality of interconnected physical or virtual sub-networks, each assigned to a specific network operator. Two or more network operators operate services in the same local area and therefore have to share the network numbering space assigned to this local area. The number portability service makes it possible for a user to keep his telephone number when changing from one network operator to another network operator.

The telecommunication network 1 is formed by a plurality of interconnected network elements providing switching and service functionalities within the telecommunication network. For example, FIG. 1 shows some of these network elements, namely network elements 31 to 36 and a network element 4. For instance, the network elements 31, 32, 34 and 36 are local exchanges assigned to different network operators and connect the terminals 21 to 27 to the telecommunication network 1. The network elements 33 and 35 are service nodes of the telecommunication network 1, for example service control points according to the IN-architecture (IN=Intelligent Network). The network element 36 is a signaling transfer point (STP).

According to a first approach, the telecommunication network 1 provides number portability by means of an IN-service. In such case, the local exchanges 31, 32, 34 and 36 are equipped with service switching functionalities and the network element 4 is a service control point triggered by the network elements 31, 32, 34 and 36. If the network element 31 is triggered for call, it maps address information according to the network numbering plan of the telecommunication network 1 to a specific network element address assigned to a network element of the network operator assigned to the terminal of the addressed subscriber.

According to a second approach, the telecommunication network 1 provides a number portability service by help of specific signaling transfer points. In such case, the network element 4 is formed by such a specific signaling transfer point that maps address information according to the network numbering plan of the telecommunication network 1 to the network address of a network element assigned to the correct operator.

The network element 4 is formed by a network element specific hardware platform, a software platform and several application programs executed based on the system platform provided by the aforementioned hard- and software platform. The functionalities of the network element 4 are performed by the execution of these software programs by the system platform. From a functional point of view, the network element 4 provides a control unit 41 and a number portability data base 42.

The number portability data base 42 is a memory with a data structure for representing, retrieving and modifying translation information mapping address information according to the network numbering plan of the telecommunication network 1 to network addresses. For example, this translation information maps a telephone number of a subscriber onto a telecommunication network internal network element address of the local exchange connecting the subscriber with the telecommunication network 1. The data structure is a tree structure with nodes and leaves operatively chained together. Leaves of this data structure stores information about network addresses, if the leaves are attached to a node. Further, at least one of the nodes holds information nominating which part of a search key applied to the data structure will be used to determine the branching of the respective node. For example, nodes nominate prefix ranges of the address information as nominated part of the search key and thereby represent translation information in a modular way with respect to prefixes used according to the network numbering plan of the telecommunication network.

FIG. 2 shows an example for such kind of data structure.

FIG. 2 shows a data structure 5 having nodes 51, 52, 53, 54 and 55 and leaves 56. Each of the nodes 51 to 55 holds information 511, 521, 531, 541 and 551, respectively, nominating which part of the search key has to be used to determine the branching of the respective node. For example, the information 511 nominates the first two digits of the search key, the information 521 nominates the third to ninth digits of the search key, the information 531 nominates the third and fourth digit of the search key, the information 541 nominates the fifth to ninth digits of the search key and the information 551 nominates the fifth to ninth digits of the search key.

The nodes 51 to 55 are operatively chained together. For example, the nodes 51 to 55 are chained together via branches 57 and the leaves 56 are attached to the nodes 51, 52, 54 and 55 via branches 58.

Further, each of the nodes 51 to 55 comprises branching information assigned to the branches of the respective node and specifying the conditions to walk the respective branch.

The control unit 41 controls the mapping of address information according to the network numbering plan of the telecommunication network 1 onto network addresses by means of the number portability data base 42.

The control unit 41 receives address information according to the network numbering plan of the telecommunication network via a INAP message from a service switching point of the telecommunication network (in case the network element 4 is a service control point) or via a number 7 signaling message (in case the network element 4 is a signaling transfer point). For example, the control unit 41 receives the telephone number or mobile identity of a called subscriber.

Then, the control unit 41 extracts a search key from the received address information. For example, it extracts the telephone or mobile identity or a part of the telephone number or of the mobile identity from the received signaling messages.

Then, the control unit 41 applies the search key on the data structure of the number portability data base. The control unit 41 performs this operation by means of a key walk logic searching the tree structure of the number portability data base 42. The key walk logic accesses the first node of the data structure and extracts the part of the search key nominated by this node. It determines the branching for this node by correlating the extracted part of the search key with the branching information hold for the various branches of this node. Then, it walks the determined branch. If this branch connects the node with another node, it repeats the aforementioned process. If the branch connects the node with an attached leaf, it accesses and reads the information stored by the respective leaf. This information represents the network address assigned to the received address information according to the network numbering plan of the telecommunication network 1.

Thereby, it is possible that the branching information assigns a branch to one or several elements of the nominated part of the search key or assigns a branch to a predefined subset or range of the elements defined by the nominated part of the search key.

FIG. 3 shows a data structure 6 according to a further embodiment of the invention.

The data structure 6 is composed of a plurality of nodes 61 to 66 and leaves 67 and 68 operatively chained together via branches 71 to 77.

Each of the nodes 61 to 66 are constructed as the nodes 51 to 55 of FIG. 2, that means it holds information nominating which part of the search key will be used to determine the branching of the respective node. Further, the nodes 62, 63, 64 and 65 are labeled with additional number range information 621, 631, 641, 642, 651, 652, 653 and 654 mapping at least one number range of the network numbering plan to network element addresses. The labeled number range is covered by the part of the search key nominated by the node. The labeled number range information forms a kind of default translation information used by the key walk logic in case there is no branching defined for a search key element. Thereby, this labeled information opens a second dimension administrated by the nodes.

According to the data structure 6, leaves of a subtree of a labeled node concern exception numbers of default number ranges defined by the labeled information. When the key walk logic walks the data structure 6 it stores labeled number range information of a parent node when walking its subtree. If no leaf or node assigned to the nominated part of the search tree, the key walk logic remembers this range information and assigns a network address according to this range information.

For example, the data structure 6 has to represent following default ranges for Inter-Network Routing Number (INRN)

16050000000-16059999999, 1700000000-1719999999 and 1720000000-1729999999 and the following default ranges for Home Location Register (HLR) addressing 1700000000-1704999999, 1705000000-1709999999, 1720000000-1723999999, 1724000000-1725999999 and 1726000000-1727999999 are assigned.

Furthermore the tree holds the exception numbers 1723436001 and

1723446244.

The label number range information 621 comprises the following information:

> 1700000000-1719999999
> serviceControlType: INRN
> serviceControlValue: 10155

This information specifies the number range as well as the assigned service control type and service access code. It holds information of multiple type.

The number range information 631 comprises the following information:

> 16050000000-16059999999
> serviceControlType: INRN
> serviceControlValue: 10634

The number range information 641 and 642 comprises the following information:

> 1700000000-1704999999
> serviceControlType: HLR
> serviceControlValue: 234567 and

> 1705000000-1709999999
> serviceControlType: HLR
> serviceControlValue: 237000

The label number range information 651, 652, 653 and 654 comprises the following information:

> 1720000000-1729999999
> serviceControlType: INRN
> serviceControlValue: 10390

> 1720000000-1723999999
> serviceControlType: HLR
> serviceControlValue: 345620

> 1724000000-1725999999
> serviceControlType: HLR
> serviceControlValue: 345621

> 1726000000-1727999999
> serviceControlType: HLR
> serviceControlValue: 345622

The leaves 67 and 68 comprise the following information:

> 1723436001
> serviceControlType: INRN
> serviceControlValue: 10391
> serviceControlType: HLR
> serviceControlValue: 345622 and

> 1723446244
> serviceControlType: INRN
> serviceControlValue: 10392
> serviceControlType: HLR
> serviceControlValue: 345621

The nodes 61, 62, 63, 64, 65 and 66 represent the numbers 1, 17, 1605, 170, 172 and 17234, respectively. Therefore, the node 1 has to respect the first four digits of the search key, the node 62 has to respect a third digit of the search key and the node 65 has to respect the fourth and fifth digits of the search key for computing branching decisions.

The invention claimed is:

1. A network element for a telecommunication network, the network element comprising:
   a receiver configured to receive address information according to a network numbering plan of the telecommunication network;
   a memory with a data structure for representing, retrieving and modifying translation information, the translation information mapping address information according to the network numbering plan to service access codes or network element addresses, the data structure having a tree structure with nodes and leaves operatively chained together wherein at least one of the nodes holds information nominating which part of a search key will be used to determine the branching of the respective node, the information held by at least one of the nodes including a service type among multiple service types such that the nominating is at least based on the multiple service types; and
   a control unit configured to (i) extract a the search key from the received address information, and (ii) apply the search key on the data structure of the memory by searching the tree structure, extracting the part of the search key nominated by the respective node, and determining the branching of the node by means of the extracted part of the search key, wherein the leaves of the data structure store information about service access codes or network element addresses, if the respective leaf is attached to a node.

2. The network element of claim 1, wherein the memory is a number portability data base.

3. The network element of claim 1, wherein the data structure provides access paths with a logarithmic bound.

4. The network element of claim 1, wherein at least one node of the data structure nominates a number prefix range of the address information as nominated part of the search key.

5. The network element of claim 1, wherein
   at least one node of the data structure is labeled with additional number range information mapping at least one number range of the network numbering plan to a service access code or network element address, and
   the labeled number range is covered by the part of the search key nominated by the node.

6. The network element of claim 5, wherein the leaves of a subtree of the labeled node concerns exception numbers.

7. The network element of claim 5, wherein the control unit is configured to store labeled number range information of a parent node when walking its subtree and to apply the stored number range information, if no leaf or node assigned to the selected branch.

8. The network element of claim 5, wherein the branch node type is extended by number and number range information of multiple type.

9. A method of mapping address information according to a network numbering plan of a telecommunication network to service access codes or network element addresses, the method comprising:
   receiving, at a network element, address information according to a network numbering plan of the telecommunication network;
   extracting a search key from the received address information;
   providing a memory with a data structure for representing, retrieving and modifying translation information, the translation information mapping address information according to the network numbering plan to service access codes or network element addresses, the data structure having a tree structure with nodes and leaves operatively chained together wherein at least one of the nodes holds information nominating which part of the search key will be used to determine the branching of the respective node, the information held by at least one of the nodes including a service type among multiple service types such that the nominating is at least based on the multiple service types; and
   applying the search key on the data structure of the memory by searching the tree structure, extracting the part of the search key nominated by the respective node, and determining the branching of the node by means of the extracted part of the search key, wherein the leaves of the data structure store information about service access codes or network element addresses, if the respective leaf is attached to a node.

10. A network element for a telecommunication network, the network element comprising:
    a receiving portion configured to receive address information according to a network numbering plan of the telecommunication network;
    an extracting portion configured to extract a search key from the received address information;
    a memory with a data structure for representing, retrieving and modifying translation information, the translation information mapping address information according to the network numbering plan to service access codes or network element addresses, the data structure having a tree structure with nodes and leaves operatively chained together wherein at least one of the nodes holds information nominating which part of the search key will be used to determine the branching of the respective node, the information held by at least one of the nodes including a service type among multiple service types such that the nominating is at least based on the multiple service types; and
    an application portion configured to apply the search key on the data structure of the memory by searching the tree structure, extract the part of the search key nominated by the respective node, and determine the branching of the node by using the extracted part of the search key, wherein the leaves of the data structure store information about service access codes or network element addresses, if the respective leaf is attached to a node.

* * * * *